(12) United States Patent
Lindfors et al.

(10) Patent No.: US 11,053,794 B2
(45) Date of Patent: Jul. 6, 2021

(54) DRILLING APPARATUS AND METHOD FOR COLLECTING RESEARCH SAMPLE

(71) Applicant: ERIMEK OY, Vantaa (FI)

(72) Inventors: Erik Lindfors, Vantaa (FI); Timo Ridaskoski, Hyvinkää (FI)

(73) Assignee: ERIMEK OY, Vantaa (FI)

( * ) Notice: Subject to any disclaimer, the term of this patent is extended or adjusted under 35 U.S.C. 154(b) by 300 days.

(21) Appl. No.: 16/311,532

(22) PCT Filed: Jun. 16, 2017

(86) PCT No.: PCT/FI2017/050452
§ 371 (c)(1),
(2) Date: Dec. 19, 2018

(87) PCT Pub. No.: WO2017/220858
PCT Pub. Date: Dec. 28, 2017

(65) Prior Publication Data
US 2019/0226338 A1    Jul. 25, 2019

(30) Foreign Application Priority Data
Jun. 23, 2016    (FI) .................................... 20165518

(51) Int. Cl.
*E21B 49/10*    (2006.01)
*E02D 1/02*    (2006.01)
(Continued)

(52) U.S. Cl.
CPC ............... *E21B 49/10* (2013.01); *E02D 1/02* (2013.01); *E02D 1/08* (2013.01); *E21B 21/015* (2013.01);
(Continued)

(58) Field of Classification Search
CPC ........ E21B 21/015; E21B 21/07; E21B 25/00; E21B 49/00; E21B 49/10; E21B 49/088; E02D 1/02; E02D 1/08; G01N 1/08
See application file for complete search history.

(56) References Cited

U.S. PATENT DOCUMENTS 1,985,157 A * 12/1934 Friedman ................ E21B 21/07
15/409
4,332,301 A * 6/1982 Jonell ....................... B04C 9/00
175/50
(Continued)

FOREIGN PATENT DOCUMENTS

CN    201945466 U    8/2011
DE    4109079 A1    10/1991
(Continued)

OTHER PUBLICATIONS

International Search Report (PCT/ISA/210) issued in PCT/FI2017/050452, dated Sep. 5, 2017.
(Continued)

*Primary Examiner* — Christopher J Sebesta
(74) *Attorney, Agent, or Firm* — Birch, Stewart, Kolasch & Birch LLP

(57) ABSTRACT

A drilling apparatus includes a drill and a dust removal pipe for removing dust created in drilling from a proximity to a borehole. The drilling apparatus includes a sampling apparatus for collecting a research sample in the dust removal pipe of the drilling apparatus. The sampling apparatus includes a sampling pipe arrangement, at the end of which there is a sampling pipe, the mouth aperture of which is fitted in the dust removal pipe, element for fixing the sampling pipe arrangement to the dust removal pipe, a suction device for forming suction in the sampling pipe, and a collecting arrangement fixed to the sampling pipe arrangement for separating sampling material from air flowing in the sam-
(Continued)

Figure 1:
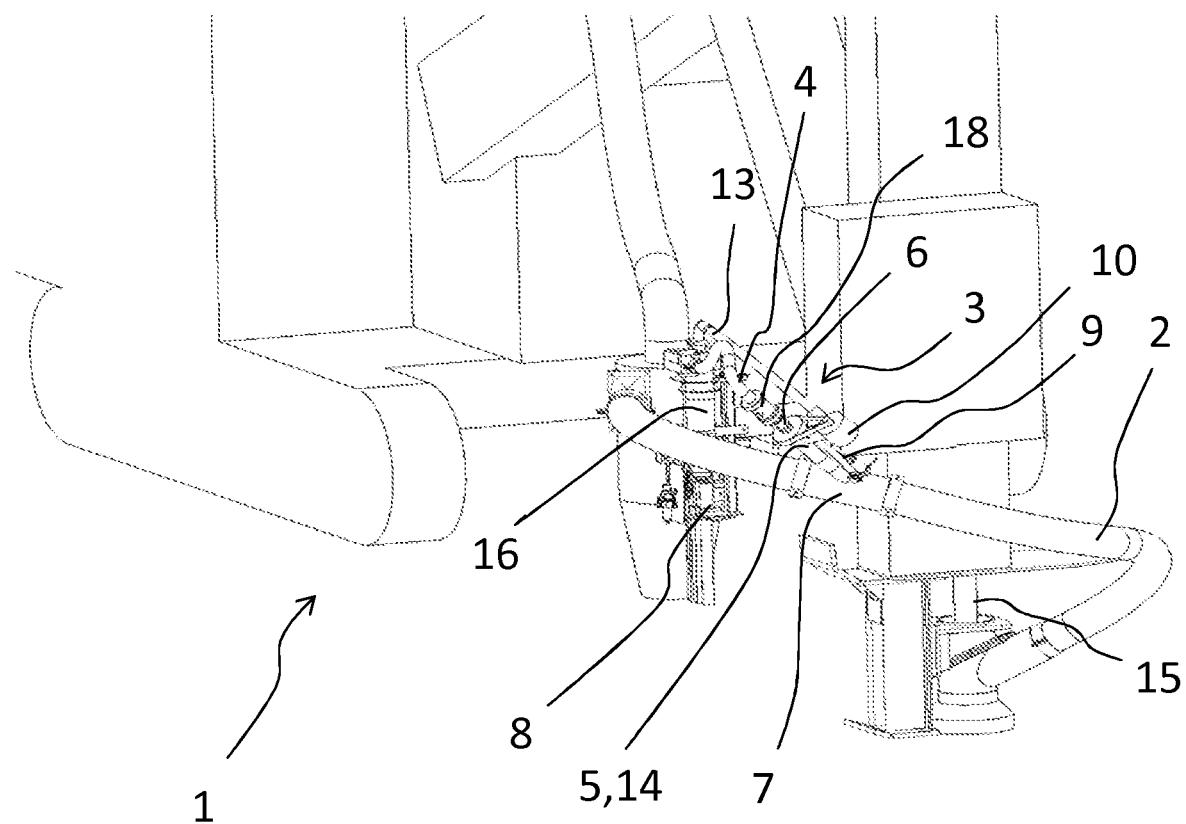

pling pipe arrangement, and for collecting sampling material. The sampling apparatus includes a length adjustment apparatus for moving the sampling pipe in the longitudinal direction in the dust removal pipe, and a rotating apparatus for rotating the sampling pipe in the dust removal pipe.

20 Claims, 3 Drawing Sheets

(51) Int. Cl.
| | | |
|---|---|---|
| *E21B 21/07* | (2006.01) | |
| *E02D 1/08* | (2006.01) | |
| *E21B 25/00* | (2006.01) | |
| *E21B 21/015* | (2006.01) | |
| *G01N 1/08* | (2006.01) | |
| *E21B 49/00* | (2006.01) | |
| *E21B 49/08* | (2006.01) | |

(52) U.S. Cl.
CPC .............. *E21B 21/07* (2013.01); *E21B 25/00* (2013.01); *E21B 49/00* (2013.01); *E21B 49/088* (2013.01); *G01N 1/08* (2013.01)

(56) References Cited

U.S. PATENT DOCUMENTS

| | | | |
|---|---|---|---|
| 4,650,013 A * | 3/1987 | Hoeft .................... | E21B 21/015 |
| | | | 175/211 |
| 5,193,883 A | 3/1993 | Spies | |
| 2011/0198130 A1* | 8/2011 | Connell ................ | E21B 21/015 |
| | | | 175/88 |
| 2014/0067307 A1 | 3/2014 | Guerriero et al. | |
| 2015/0068806 A1* | 3/2015 | Duran Toro ............ | E21B 49/00 |
| | | | 175/50 |
| 2015/0176345 A1* | 6/2015 | Koskinen .................. | E21B 3/02 |
| | | | 175/57 |

FOREIGN PATENT DOCUMENTS

| | | |
|---|---|---|
| FI | 125722 B | 1/2016 |
| WO | WO 2010/029216 A1 | 3/2010 |
| WO | WO 2014/044904 A1 | 3/2014 |

OTHER PUBLICATIONS

Written Opinion (PCT/ISA/237) issued in PCT/FI2017/050452, dated Sep. 5, 2017.

* cited by examiner

DRILLING APPARATUS AND METHOD FOR COLLECTING RESEARCH SAMPLE

The object of the invention is a sampling apparatus intended for collecting geological research samples, which apparatus is suited e.g. for underground drilling use in production or in ore searching. The object of the invention is also a drilling apparatus and a method for collecting research sample from the drilling apparatus.

The excavating of ore or other minerals is performed typically at mines by drilling and by loading a number of pluralities of deep holes in an advantageous grouping in terms of the blasting technique. Compressed air, compressed air-water mix or water, blown via a boring pipe is used in drilling deep boreholes to transport the rock material that is detached by the drill bit out of the borehole. Due to the action of medium, the rock material typically flies into a small heap around the borehole. In smaller, carriage-like drilling machines the borehole is closed with a rubber collar, and the rock material flying out of the hole is absorbed via a dust removal pipe into a dust separator. The ore being sought is not always evenly distributed in the bedrock of the mining area, but there can be adjoining rock or so-called internal gangue having a smaller or non-existent ore content mixed up with the ore deposit. The excavation of adjoining rock cannot be avoided, but it is worth minimizing the progression of the adjoining rock into the crushing phases and ore cleaning phases. From the viewpoint of the ore cleaning process, it is advantageous to know in advance as accurately as possible the grade of the crushed ore material entering the process and to avoid its processing by excavating it apart.

The grade of the ore material in the ore intended to be excavated is first ascertained with trial boring, and in the production drilling stage by collecting rock samples into sample bags with a shovel from the piles of rock material produced around the boreholes in the drilling. The sample collecting work is often performed manually, and it requires an employee to move around at the drilling field. Drilling field conditions are typically dusty, and the nature of the flying dust detaching from piles can be detrimental to the health of the employee collecting samples. From the collected samples a sample is made by splitting several times, from which sample the contents of the target minerals are determined. A weak point with pile samples is that from the rock material taken from a pile, it is no longer possible to observe information about the depth of adjoining rock deposits or ore deposits from the drilling level. A sample taken from a pile represents a sort of average hole, which often is unrepresentative. It is also known in the art that some of the target mineral has possibly escaped along with the finer material carried by the wind, so a higher proportion of adjoining rock in relation to the target mineral has remained in the pile.

Known solutions to the problem are to install on the boring pipe a collar, or suchlike system, covering the whole borehole, to collect rock material coming out of the hole and to split the whole amount of material a number of times, automatically or manually, to install a flow guide on the collar, and to turn part of the flow into a separate bag functioning as a sample collector, or to take a small amount of rock material from the mouth of the borehole with a suction nozzle, and to separate the rock material with a separate cyclone into a sample bag as stated in the publication FI 125722B. The sampling method described in the publication FI 125722B is not easily suitable for use in smaller drilling machine types.

Publication U.S. Pat. No. 4,650,013 presents a ground sampling apparatus, by means of which ground samples can be taken from a hole drilled in the ground. It has a bag-like collection container, in which the ground samples are collected. The ground samples are fed into the collection container via a mouth piece that is in an inclined position on the edge of a vertical pipe. The area of the borehole is covered with an elastic cover.

The drawback in sampling apparatuses according to prior art are, in general, a poor sampling accuracy and a complex structure of the apparatus.

The aim of the present invention is to reduce the afore mentioned drawbacks and to achieve a sampling apparatus, a drilling apparatus and a method, with which an exact representative sample with respect to sampling of the excavated ore can be produced.

The aim according to the invention can be achieved with a sampling apparatus according to claim 1, with a drilling apparatus according to claim 7 and with a method according to claim 10.

A sampling apparatus according to the invention comprises a sampling pipe arrangement, at the end of which there is a sampling pipe, the mouth aperture of which is fittable in the dust removal pipe of the drilling apparatus, element for fixing the sampling pipe arrangement to the dust removal pipe, means for forming suction into the sampling pipe, collecting arrangement fixed to the sampling pipe arrangement for separating the sampling material form the air flowing in the sample pipe arrangement and for collecting sampling material. Furthermore, the sampling arrangement comprises a length adjustment apparatus for moving the sampling pipe in longitudinal direction in the dust removal pipe and/or a rotating apparatus for rotating a sampling pipe in the dust removal pipe.

Significant advantages can be achieved with the invention. In the invention, a research sample is taken from the air discharging from the borehole and containing rock material, which air has been collected in the dust removal pipe already existing in the drilling apparatus in the proximity to the mouth aperture of the borehole, which can be covered with a collar or with a rubber protector. The size of the sample is limited, preferably to be small but to be highly representative of the bedrock by collecting the sample from the rock material flying out in the dust removal pipe. A partial vacuum area in the flowing field of the dust removal pipe collects rock material that has flown out of the borehole and struck its surface area. This material also contains a fraction of fine-grained rock material flying out along with the wind.

Only a part of the whole flow of rock material plus air coming from the borehole flies into the mouth aperture of the sampling pipe. By selecting the size of the mouth aperture it is advantageously achieved that less post-processing of a sample by splitting, or by some similar method, is needed or is not needed at all. The representativeness of the sample is better than that of methods known in the art, because the sample contains also particles normally escaping as airborne dust.

A better level in sampling accuracy, savings in the labor costs in sampling, and a better work safety level and work hygiene level can be achieved with the invention. Sampling apparatus according to the invention can be produced to be small-sized. In addition, the sampling apparatus can easily be fitted to different types of drilling apparatuses.

Due to a high sampling accuracy of the sampling apparatus according to the invention and due to the location data given by the sample, a worthless adjoining rock or different ore types can be separated from each other either totally or in part in loading phase, which has a significant impact on the process producing savings in costs and other advantages in further processing.

In the apparatus according to the invention, position of a sampling pipe in the dust removal pipe, and the incidence angle position inside the pipe can be adjusted with a length adjustment apparatus and with a rotating apparatus, wherein the mouth aperture of the sampling pipe can be brought to a desired position in the direction of the radius of the dust removal pipe and to a desired angle with respect to the flow of the dust removal pipe. The mouth aperture of the sampling pipe can be directed towards bore dust flowing in the dust removal pipe so that it is able to take samples directly from the rock material flying in the pipe. The position of the sampling pipe can be changed by moving the sampling pipe in the longitudinal direction, and the surface area of the sample can be adjusted by rotating the sampling pipe. Then the sample can be taken from a desired point of the dust removal pipe, and/or the amount of the sample pro drilled hole meter can be adjusted, and/or the sampling can be focused on a certain particle size distribution.

According to one embodiment of the invention a strong flow of compressed air can be produced in the sampling pipe, in the pipe between the flow amplifier and the dust separation cyclone and/or in the removal pipe, with which flow of compressed air the sampling arrangement is cleaned from a possible wet rock material when the drill bit has hit the groundwater.

In one embodiment of the invention turbulence of mix of fluid and rock material in dust removal pipe is increased with a flow shaper before the mouth aperture of the sampling pipe, wherein the mixture flowing in the dust removal pipe is mixed as good as possible in the sampling place. In addition, a flow shaper directs the flow towards the mouth aperture of the sampling pipe. The narrowing in the dust removal pipe, e.g. a narrowing ring, can act as a flow shaper where flow cross sectional area in the dust removal pipe is smaller than before and/or after the flow shaper.

Figure 2:
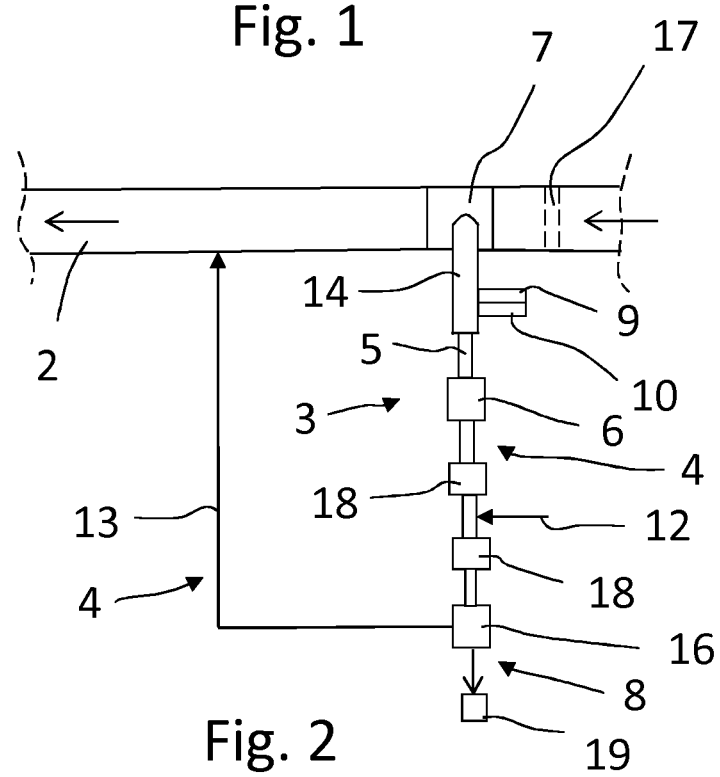
Figure 3:
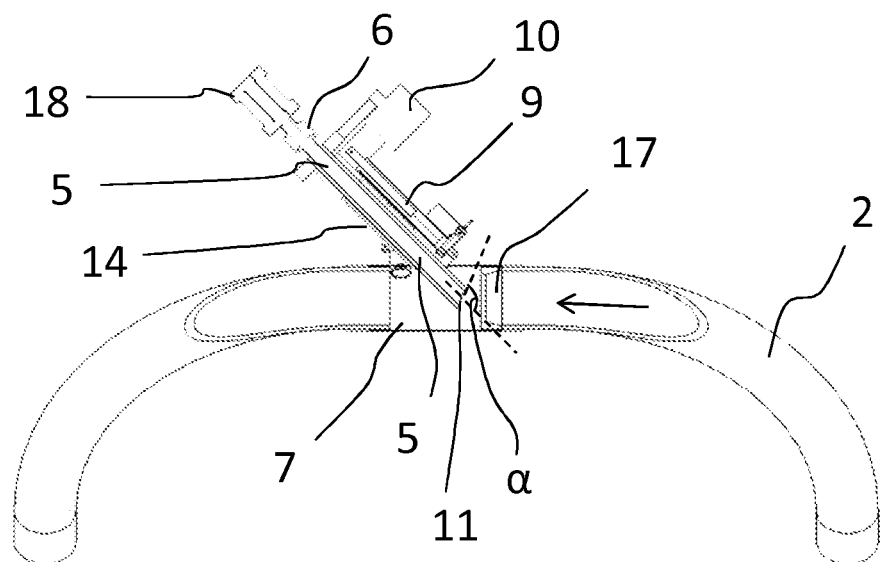
Figure 4:
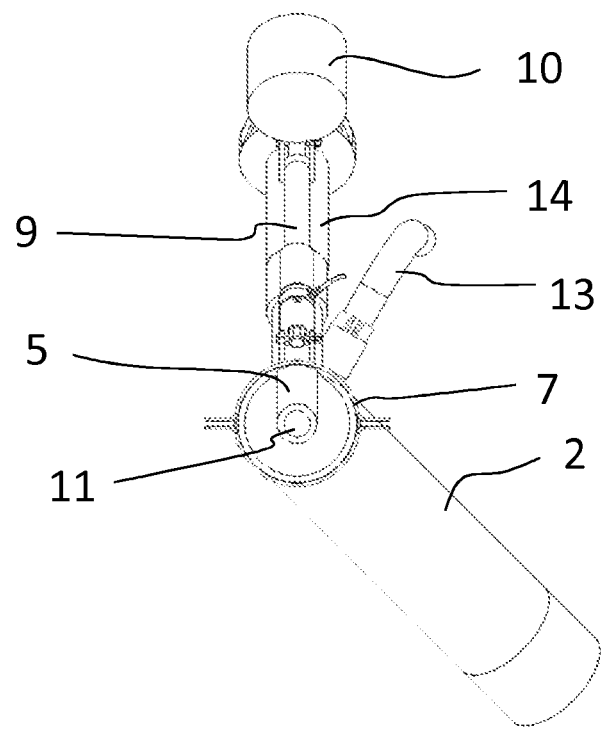
Figure 5:
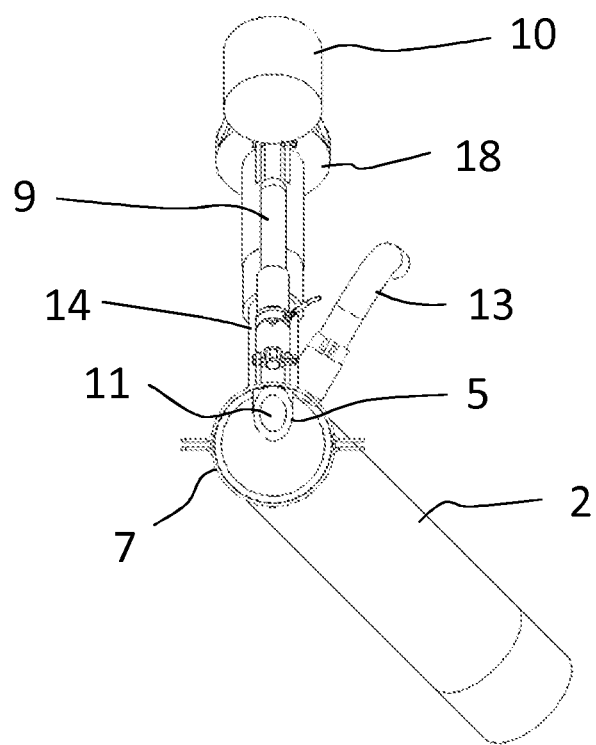

In the following, the invention will be described in detail by the aid of embodiments with reference to the attached drawings, wherein:

FIG. 1 presents a drilling apparatus according to one embodiment of the invention, FIG. 2 presents a schematic view of a dust removal pipe of a drilling apparatus of FIG. 1, to which dust removal pipe a sampling arrangement according to an embodiment of the invention has been fixed, FIG. 3 presents a partial sectional side view of a dust removal pipe of a drilling apparatus of FIG. 1, FIG. 4 presents a sectional view of a dust removal pipe of a drilling apparatus of FIG. 1, and FIG. 5 presents a sectional view of a dust removal pipe of a drilling apparatus of FIG. 1, in which dust removal pipe the sampling pipe is adjusted so that it takes a sample on the edge of the dust removal pipe.

FIG. 1 presents a drilling apparatus 1 comprising a bore 15 and a dust removal pipe 2, by which dust forming by drilling is removed from the proximity to the borehole. A drilling apparatus can be, for example, an underground drill rig used in open cast mines, with a chassis and with a bore 15 fitted to the rig, which is provided with an extendable boring pipe and a drill bit (not presented) at the end of it. The drilling apparatus 1 can be movable in the mining area, e.g. by a motor-driven crawler chassis. The drilling apparatus 1 comprises a control unit for controlling it.

Holes are bored in the ground with the drilling apparatus 1, from which holes material, e.g. rock material discharges out of the borehole onto the ground surface. The drilling apparatus 1 according to FIG. 1 is used in drilling deep boreholes, wherein fluid, such as water, compressed air, or a compressed air-water mix, is directed via the stem of the drill bit to transport the rock material that is detached by the drill bit out of the borehole. The drilling apparatus 1 comprises a dust removal pipe 2 for removing dust, which is escaping from the borehole of the dust removal pipe 2 with suction. The mouth aperture of the dust removal pipe 2 is situated in the proximity to the mouth aperture of the borehole, e.g. above the mouth aperture of the borehole, or it surrounds the mouth aperture of the borehole. A suction device is fixed to the dust removal pipe 2 for providing suction in the dust removal pipe 2. In addition, the dust removal pipe 2 is fixed to the separating device, e.g. to a cyclone, with which dust is separated from air.

For sampling the drilling apparatus 1 comprises a sampling apparatus 3 according to the invention for collecting research samples from the rock material flowing in the dust removal pipe 2. The sampling apparatus 3 comprises a sampling pipe arrangement 4, at the end of which there is a sampling pipe 5. The mouth aperture 11 of the sampling pipe 5 is fitted in the dust removal pipe 2. The sampling pipe arrangement 4 comprises a protective pipe 14, inside of which a sampling pipe 5 is fitted. The protective pipe 14 is fixed to a fixing element 7, such as a bushing, which is fixed to the dust removal pipe 2. There is an aperture in the bushing 7, via which aperture the sampling device 5 can be fitted in the dust removal pipe 2. The sampling pipe 5 can be moved in the longitudinal direction and/or rotated in the protection pipe 14.

The dust removal pipe 2 is provided with a flow shaper 17 for increasing turbulence of flow of mix of air and rock material flowing in the dust removal pipe 2. The flow shaper 17 is displaced in the dust removal pipe 2 before the mouth aperture 11 of the sampling pipe 5 in the flow direction, wherein the mix flowing in the dust removal pipe is mixed as good as possible in the sampling place. In addition, the flow shaper 17 directs the flow towards the mouth aperture 11 of the sampling pipe. The narrowing in the dust removal pipe 2, e.g. a narrowing ring, can act as a flow shaper where flow cross sectional area in the dust removal pipe 2 is smaller than before and/or after the flow shaper 17. In the drawings, the flow directions are indicated with arrows.

The level of the mouth aperture 11 of the sampling pipe 5 is in an oblique angle $\alpha$ to the central axis of the sampling pipe 5, wherein the level of the mouth aperture 11 is against the flow in the dust removal pipe with a minor inclination of the sampling pipe 5. This way the sampling can be made more effective. The angle $\alpha$ between the level of the mouth aperture 11 and central axis of the sampling pipe is flow technically advantageous. The angle $\alpha$ is at least 100°, typically 110-150°.

The sampling apparatus 3 comprises a length adjustment apparatus 9 for moving the sampling pipe 5 in the longitudinal direction in the dust removal pipe 2. In this way the location of the mouth aperture 11 in the sampling pipe can be adjusted in the radial direction of the dust removal pipe 2. The length adjustment apparatus 9 can be a spindle motor, a hydraulic cylinder or a pneumatic cylinder. In FIGS. 3 and 4, for example, the mouth aperture of the sampling pipe 5 is in the middle of the dust removal pipe 2, as in FIG. 5 the sampling pipe 5 has been lifted with a length adjustment apparatus 9 in such a way that the mouth aperture is on the edge of the dust removal pipe 2. The length adjustment apparatus 9 is fixed to the protective pipe 14 or to the bushing 7.

In addition, the sampling apparatus 3 comprises a rotating apparatus 10 for rotating a sampling pipe 5 around its longitudinal axis. In this way the incidence angle between flow of the mouth aperture 11 of the sampling pipe 5 and of the dust removal pipe 2 can be adjusted The rotating apparatus 10 can be, e.g. a direct-current motor or a step motor, which is connected to the sampling pipe 5 with a toothed belt witching, for example. The rotating apparatus 10 is fixed to the protective pipe 14.

The sampling apparatus 3 comprises means for forming suction in the sampling pipe 5. The means for forming suction can be a flow amplifier 6 connected to the sampling pipe arrangement, with which the suction of the sampling pipe 5, and a overpressure for the parts of the sampling pipe arrangement 4 after the flow amplifier 6 in the flow direction, which boosts the passage of rock material in the sampling pipe arrangement 4, are created. The flow amplifier 6 can be an ejector, for example, which is provided with a fitting connected to a source of compressed air, for example to a compressor of the drilling apparatus. With compressed air directed to the flow amplifier 6, partial vacuum is brought in the sampling pipe 5 with respect to the pressure in the dust removal pipe 2, and overpressure in the parts of the sampling pipe arrangement 4 after the flow amplifier 6 with respect to the pressure in the dust removal pipe 2. The sampling apparatus 3 comprises also an adjuster for adjusting the pressure of the compressed air feeded to the flow amplifier 6. By adjusting the pressure of the compressed air, partial vacuum dominant in the sampling pipe 5, and overpressure in the part of the sampling pipe arrangement 4 after the flow amplifier 6 can be adjusted.

In addition, the sampling apparatus 3 comprises a collecting arrangement 8 fixed to the sampling pipe arrangement 4 for separating sample material from the air flowing in the sampling pipe arrangement 4, and for collecting sample material into the sample bin 19, such as into a sample bag. The collecting arrangement 8 comprises separating device 16, for example a cyclone, for separating rock material from air flow in the sampling pipe arrangement 4. Cyclones, filters, or combinations of cyclones and filters, or other such dust separation methods and devices generally known in industry, can be used as apparatuses for separating rock material and air.

Collecting arrangement 8 comprises a sample bin 19, such as a sample bag, into which sampling material is directed from the separating device 16. In addition, the collecting arrangement 8 can comprise a rotatable sampling magazine on the rim of which sample bins 19, such as sample bags, are arranged. The feed-in into the sample bags occurs by rotating the magazine with a rotating machine so that the sample bag to be filled is at the underneath the cyclone, wherein the rock material falls from the cyclone into the sample bag. The structure of the separating device 16 has to be such that in the separating device the rock material does not mix in the separating process with the rock material coming earlier from the bore aperture. This is important because the part of the material that is closest to the surface of bore aperture accumulates at the bottom of the sample bag, and finally rock material comes from the bottom of the borehole.

It is advantageous to select plastic film as the material of the sample bags, which plastic film enables rapid analysis of samples for example with a XRF method and with portable devices before more time-consuming conventional analysis. It is also advantageous to select the shape of the sample bag to be elongated so that the material that has come from different areas of the borehole can be analyzed visually or with the aforementioned XRF method utilizing fluorescence radiation.

In addition, the sampling pipe arrangement 4 comprises a return pipe 13 for directing air that is to be removed from the collecting arrangement 8 back to the dust removal pipe 2. The return pipe 13 is connected to the sampling arrangement 8, for example to a cyclone. In addition, the return pipe 13 is connected to the dust removal pipe 2, advantageously after the mouth aperture 11 of the sampling pipe in the flow direction in the dust removal pipe 2. The impact of the variation of partial vacuum level dominating in the dust removal pipe 2 on the operation of the sampling apparatus 3 can be adjusted with the return pipe 13. Partial vacuum level in the dust removal pipe 2 may vary depending on the drilling apparatus. In addition, various drilling apparatus manufactures use different partial vacuum levels in dust removal pipes 2.

The sampling pipe arrangement 4 comprises a feeding connector 12 for feeding compressed air to the sampling pipe arrangement 4. The feeding connector 12 is provided with a closing device, such as a valve, with which air flow away from the sampling pipe arrangement via the feeding connector 12 can be prevented. The closing device can be a closing valve or a back-pressure valve, which allows the flow from the feeding connector 12 towards the sampling pipe arrangement 4. By directing compressed air from the feeding connector 12 to the sampling pipe arrangement 4, the impurities accumulated in the sampling pipe arrangement 4 or elsewhere in the sampling device 3 can be blasted to the dust removal pipe 2. Impurities, such as wet rock material, can be accumulated in the sampling device 3 for example in situations where the drill bit of the drilling apparatus 1 hits the groundwater zone. In the sampling pipe arrangement, the feeding connector 12 is arranged between collecting arrangement 8 and sampling pipe 5, advantageously between the collecting arrangement 8 and the flow amplifier 6. In the sampling pipe arrangement 4, a closing element 18 is arranged between the feeding connector 12 and the collecting arrangement 8 and/or between the feeding connector 12 and the flow amplifier 6 for preventing and allowing air flow in the sampling piping 4. With the aid of the closing element 18, blast from the feeding assembly 12 can be directed to a desired part in the sampling apparatus 3. The closing element 18 can be a valve, for example a pinch valve. Compressed air is directed to the feeding connector 12 for example from the compressor of the drilling apparatus 1. Compressed air flow of the feeding connector 12 will be turned on either manually or automatically.

The sampling apparatus 3 is provided with a control unit, which can be separate, or it can be integrated into the control system of the drilling apparatus 1. With the control unit, the functions of the sampling apparatus 3, such as length adjustment apparatus 9 and rotating apparatus 10 of the sampling pipe, closing elements 18, flow of compressed air of the feeding assembly 12, the strength of the suction of the amplifier 6, and/or the function of the collecting arrangement 8 are controlled.

The drilling apparatus 1 and sampling apparatus 3 function as follows. A hole is drilled in rock with a drill of the drilling apparatus 1. From the borehole discharging, rock material comprising drill dust is absorbed into the dust removal pipe 2. In the dust removal pipe 2, turbulence of flow is increased with a flow shaper 17. Dust is sucked from the dust removal pipe 2 into the sampling pipe 5, from which it flows further through the flow amplifier 6 into the collecting arrangement 8. Rock material is separated from air with separating device 16 of collecting arrangement, such as cyclone, and collected into the sampling bin 19. From the collecting arrangement 8 air to be discharged is directed along the return pipe 13 back into the dust removal pipe 2. Air is directed to the sampling pipe after the mouth aperture 11 in the flow direction of the dust. Sampling pipe 5 is moved in the dust removal pipe 2 in longitudinal direction with a length adjustment apparatus 9 and/or is rotated around its longitudinal axis with the rotating apparatus 10.

If impurities are drifting into the sampling apparatus 3, for example wet rock material, the sampling apparatus 3 can be cleaned. Then the suction of the sampling pipe 5 is turned off for example by stopping the feeding of the compressed air into the flow amplifier 6. Thereafter, compressed air is blown via the feeding assembly 12 into the sampling pipe arrangement 4. With closing elements 18 blasting is directed to desired parts in the sampling apparatus 3.

It is obvious to the person skilled in the art that the different embodiments of the invention are not limited solely to the examples presented above, but they may be varied within the scope of the claims presented below.

The invention claimed is:

1. A drilling apparatus, which comprises
   a drill;
   a dust removal pipe for removing dust created in drilling from a proximity to a borehole; and
   a sampling apparatus for collecting research sample in the dust removal pipe of the drilling apparatus, the sampling apparatus comprising:
      a sampling pipe arrangement, wherein at the end of sampling pipe arrangement there is a sampling pipe, and wherein a mouth aperture of the sampling pipe is fitted in the dust removal pipe;
      an element for fixing the sampling pipe arrangement to the dust removal pipe;
      a suction device configured to form suction in the sampling pipe;
      a collecting arrangement fixed to the sampling pipe arrangement for separating sampling material from the air flowing in the sampling pipe arrangement and for collecting sampling material;
      a length adjustment apparatus for moving the sampling pipe in the longitudinal direction in the dust removal pipe; and
      a rotating apparatus for rotating the sampling pipe in the dust removal pipe,
   wherein one end of the sampling pipe is fitted into the dust removal pipe and the other end of the sampling pipe is outside of the dust removal pipe and connected to the suction device which is provided outside of the dust removal pipe, and
   wherein the sampling apparatus is configured in such a manner that the dust is sucked into the sampling pipe by the suction device, and is conveyed to the collecting arrangement through the sampling pipe.

2. The drilling apparatus according to claim 1, wherein the suction device comprises a flow amplifier connected to the sampling pipe arrangement, with which flow amplifier partial vacuum is creatable in the mouth aperture of the sampling pipe, and overpressure on the opposite side of the flow amplifier of the sampling pipe arrangement with respect to the mouth aperture for boosting the flow.

3. The drilling apparatus according to claim 2, wherein the sampling pipe arrangement comprises a feeding connector for feeding compressed air into the sampling pipe arrangement between the collection arrangement and sampling pipe.

4. The drilling apparatus according to claim 2, wherein the sampling pipe arrangement comprises a return pipe for directing air that is to be discharged from the collecting arrangement into the dust removal pipe.

5. The drilling apparatus according to claim 2, wherein the sampling pipe is arranged in a protective pipe, and the sampling pipe is movable in a longitudinal direction with the length adjusting apparatus and/or rotatable with the rotating apparatus in the protective pipe.

6. The drilling apparatus according to claim 2, wherein the return pipe of the sampling apparatus is connected to the dust removal pipe, after the mouth aperture of the sampling pipe in the flow direction of dust in the dust removal pipe.

7. The drilling apparatus according to claim 1, wherein the sampling pipe arrangement comprises a feeding connector for feeding compressed air into the sampling pipe arrangement between the collection arrangement and sampling pipe.

8. The drilling apparatus according to claim 7, wherein a closing element is arranged in the sampling pipe arrangement between the feeding connector for compressed air and the sampling pipe and/or between the feeding connector for compressed air and the collecting arrangement for preventing and allowing air flow.

9. The drilling apparatus according to claim 8, wherein the sampling pipe arrangement comprises a return pipe for directing air that is to be discharged from the collecting arrangement into the dust removal pipe.

10. The drilling apparatus according to claim 8, wherein the sampling pipe is arranged in a protective pipe, and the sampling pipe is movable in a longitudinal direction with the length adjusting apparatus and/or rotatable with the rotating apparatus in the protective pipe.

11. The drilling apparatus according to claim 7, wherein the sampling pipe arrangement comprises a return pipe for directing air that is to be discharged from the collecting arrangement into the dust removal pipe.

12. The drilling apparatus according to claim 7, wherein the sampling pipe is arranged in a protective pipe, and the sampling pipe is movable in a longitudinal direction with the length adjusting apparatus and/or rotatable with the rotating apparatus in the protective pipe.

13. The drilling apparatus according to claim 1, wherein the sampling pipe arrangement comprises a return pipe for directing air that is to be discharged from the collecting arrangement into the dust removal pipe.

14. The drilling apparatus according to claim 13, wherein the sampling pipe is arranged in a protective pipe, and the sampling pipe is movable in a longitudinal direction with the length adjusting apparatus and/or rotatable with the rotating apparatus in the protective pipe.

15. The drilling apparatus according to claim 1, wherein the sampling pipe is arranged in a protective pipe, and the sampling pipe is movable in a longitudinal direction with the length adjusting apparatus and/or rotatable with the rotating apparatus in the protective pipe.

16. The drilling apparatus according to claim 1, wherein the return pipe of the sampling apparatus is connected to the dust removal pipe, after the mouth aperture of the sampling pipe in the flow direction of dust in the dust removal pipe.

17. The drilling apparatus according to claim 1, wherein a flow shaper is arranged in the dust removal pipe for increasing turbulence of air and rock material flow, the flow shaper being placed in the dust removal pipe before the mouth aperture of the sampling pipe in the flow direction.

18. A method for collecting a research sample in a drilling apparatus, said method comprising the steps of:

sucking dust created in drilling to a dust removal pipe of the drilling apparatus;

sucking dust from the dust removal pipe into a sampling pipe of a sampling apparatus, and directing dust along a sampling pipe arrangement into a collecting arrangement, where the sample material is separated from air and into which collecting arrangement sample material is collected; and moving the sampling pipe in a longitudinal direction in the dust removal pipe with a length adjustment device and rotating the sampling pipe around a longitudinal axis thereof with a rotating apparatus, wherein one end of the sampling pipe is fitted into the dust removal pipe and the other end of the sampling pipe is outside of the dust removal pipe and connected to the suction device which is provided outside of the dust removal pipe, and wherein the dust is sucked into the sampling pipe by the suction device, and is conveyed to the collecting arrangement through the sampling pipe.

19. The method according to claim 18, further comprising the step of directing air sucked from the dust removal pipe from the collecting arrangement back to the dust removal pipe, after the mouth aperture of the sampling pipe in the flow direction of the dust in the dust removal pipe.

20. The method according to claim 18, further comprising the step of cleaning the sampling apparatus by cutting the suction from the sampling pipe and by blowing compressed air, water or a mixture thereof into the sampling pipe arrangement.

* * * * *